(12) United States Patent
Kroupenkine

(10) Patent No.: US 7,006,299 B2
(45) Date of Patent: Feb. 28, 2006

(54) METHOD AND APPARATUS FOR CALIBRATING A TUNABLE MICROLENS

(75) Inventor: Timofei Nikita Kroupenkine, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/884,592

(22) Filed: Jul. 2, 2004

(65) Prior Publication Data

US 2005/0002112 A1  Jan. 6, 2005

Related U.S. Application Data (60) Division of application No. 10/139,124, filed on May 3, 2002, now Pat. No. 6,965,480, and a continuation-in-part of application No. 10/135,973, filed on Apr. 30, 2002, now Pat. No. 6,665,127, and a continuation-in-part of application No. 09/884,605, filed on Jun. 19, 2001, now Pat. No. 6,538,823.

(51) Int. Cl.
*G02B 1/06* (2006.01)
*G02B 3/12* (2006.01)

(52) U.S. Cl. ..................................... 359/665
(58) Field of Classification Search ................ 359/665, 359/666, 642, 796; 385/33, 35, 39–41; 356/124, 356/125, 127
See application file for complete search history.

(56) References Cited

U.S. PATENT DOCUMENTS

| | | | |
|---|---|---|---|
| 3,670,130 A | 6/1972 | Greenwood et al. | ........ 200/183 |
| 4,030,813 A | 6/1977 | Kohashi et al. | ............. 359/245 |
| 4,118,270 A | 10/1978 | Pan et al. | ..................... 156/659 |
| 4,137,060 A | 1/1979 | Timmermann | .................. 65/31 |
| 4,338,352 A | 7/1982 | Bear et al. | ...................... 427/8 |
| 4,406,732 A | 9/1983 | Kayoun | ...................... 156/626 |
| 4,569,575 A | 2/1986 | Le Pesant et al. | .......... 350/355 |
| 4,653,847 A | 3/1987 | Berg et al. | ................. 350/96.2 |
| 4,671,609 A | 6/1987 | Khoe et al. | ............. 350/96.18 |
| 4,708,426 A | 11/1987 | Khoe | ...................... 350/96.18 |
| 4,867,521 A | 9/1989 | Mallinson | ................. 350/96.18 |
| 4,948,214 A | 8/1990 | Hamblen | ..................... 350/413 |
| 5,412,746 A | 5/1995 | Rossberg et al. | ............. 385/48 |
| 5,486,337 A | 1/1996 | Ohkawa | ..................... 422/100 |
| 5,518,863 A | 5/1996 | Pawluczyk | .................. 430/321 |
| 5,659,330 A | 8/1997 | Sheridon | ...................... 345/84 |
| 6,014,259 A | 1/2000 | Wohlstadter | ................ 359/619 |
| 6,369,954 B1 | 4/2002 | Berge et al. | ................ 359/666 |
| 6,538,823 B1 | 3/2003 | Kroupenkine et al. | |
| 6,545,815 B1 | 4/2003 | Kroupenkine et al. | |

(Continued)

OTHER PUBLICATIONS

U.S. Appl. No. 10/139,124, filed May 3, 2002, Kroupenkine, et al.

(Continued)

*Primary Examiner*—Jordan M. Schwartz
(74) *Attorney, Agent, or Firm*—David W. Herring; Donald P. Dinella (57) ABSTRACT

A tunable microlens uses at least two layers of electrodes and a droplet of conducting liquid. Such a droplet, which forms the optics of the microlens, moves toward an electrode with a higher voltage relative to other electrodes in the microlens. When calibration of the microlens is desired, an equal and constant voltage is passed over the first layer of electrodes and a different, constant voltage is passed over the second layer of electrodes such that the droplet of conducting fluid is adjusted to a calibrated position.

4 Claims, 5 Drawing Sheets

U.S. PATENT DOCUMENTS

| | | |
|---|---|---|
| 6,545,816 B1 | 4/2003 | Kroupenkine et al. |
| 6,665,127 B1 | 12/2003 | Bao et al. |
| 6,674,940 B1 | 1/2004 | Kroupenkine |
| 2003/0202256 A1 * | 10/2003 | Bao et al. .................... 359/665 |
| 2003/0027100 A1 * | 12/2003 | Chandross et al. ......... 264/1.36 |

OTHER PUBLICATIONS

U.S. Appl. No. 10/231,614, filed Aug. 30, 2002, Kroupenkine, et al.

U.S. Appl. No. 10/637,837, filed Aug. 8, 2003, Davis, et al.

* cited by examiner

METHOD AND APPARATUS FOR CALIBRATING A TUNABLE MICROLENS

CROSS REFERENCE TO RELATED APPLICATIONS

This application is a divisional application of and claims priority to U.S. patent application Ser. No. 10/139,124, entitled "Method and Apparatus for Calibrating A Photo-Tunable Microlens," filed May 3, 2002, now U.S. Pat. No. 6,965,480, and is a continuation in part of application Ser. No. 10/135,973, entitled "Method and Apparatus for Aligning A Photo-Tunable Microlens," filed Apr. 30, 2002, now U.S. Pat. No. 6,665,127, and is further a continuation in part of application Ser. No. 09/884,605, entitled "Tunable Liquid Microlens," filed Jun. 19, 2001, now U.S. Pat. No. 6,538,823.

FIELD OF THE INVENTION

The present invention relates to microlenses, and more particularly, to liquid microlenses.

BACKGROUND OF THE INVENTION

Lasers, photodetectors, and other optical components are widely used in many optoelectronic applications such as, for example, optical communications systems. Traditionally in such applications, manual positioning and tuning of the components is required to maintain the desired optical coupling between the system components However, such manual positioning can be slow and quite expensive.

More recently, in attempts to eliminate this manual positioning of the system components, small tunable lenses (also known as tunable microlenses) were developed to achieve optimal optical coupling. Typically, these microlenses are placed between an optical signal transmitter, such as a laser, and an optical signal receiver, such as a photodetector. The microlens, which uses a droplet of liquid as a lens, acts to focus the optical signal (e.g., that is emitted by the laser) onto its intended destination (e.g., the photodetector). In some cases the position and curvature of these microlenses is automatically varied in order to change the optical properties (e.g., the focal length and focal spot position) of the microlens when, for example, the direction or divergence of a light beam incident upon the microlens varies from its optimized direction or divergence. Thus, the desired optical coupling is maintained between the components of the optical system. Therefore, the manual positioning and adjustment required in previous systems is either substantially reduced or even completely eliminated.

While the prior art electrowetting-based microlenses described above are useful in certain applications, they are also limited in certain aspects of their usefulness. In particular, none of the prior art electrowetting microlenses provided a mechanism for achieving automatic microlens calibration, i.e. its automatic return to some nominal, calibrated state with a defined position and focal length. This might be disadvantageous in certain applications. For example, there are many situations where some sort of a search and optimization algorithm needs to be employed in order to achieve optimal tuning/positioning of the droplet. In the prior art solutions, which do not use a calibration mechanism to first calibrate the position of the droplet, the algorithm must start from an unknown microlens position. This could result in a substantial increase in the time necessary to complete the microlens tuning/positioning process.

SUMMARY OF THE INVENTION

While prior microlens embodiments reduce the need for manual positioning or tuning of components of an optical system, we have recognized that there remains a need to provide a tunable liquid microlens that is capable of automatic calibration. In particular, in certain applications it may be advantageous to have a microlens that is self-calibrating. Such a microlens would eliminate the time and effort associated with calibrating a microlens by first moving the droplet to a known position and then moving the droplet of liquid of the microlens to a nominal, calibrated position.

Therefore, we have invented a microlens that uses at least two layers of electrodes, one of which acts as a layer of calibrating electrodes. When a calibrating voltage is applied to the electrodes in this calibrating layer, the droplet, which forms the optics of the microlens, will quickly and automatically reach a nominal, calibrated position relative to the calibration electrodes in the microlens.

One embodiment of such a self-tunable microlens comprises a transparent conducting substrate of a material (such as transparent ITO (indium tin oxide) glass) that is transparent to at least one wavelength of light useful in an optical system. A first, lower layer of electrodes is disposed within a dielectric material which is in turn disposed on the transparent conducting substrate. Each of these electrodes is attached to at least one voltage source so that the electrodes in the first, lower layer may be selectively biased to create a respective voltage potential between a droplet of conducting liquid disposed on the dielectric material and each of the electrodes in the first, lower layer. The droplet of liquid tends to move to a higher voltage and, therefore, can be repositioned by varying the voltages applied to this first, lower layer of electrodes. The layer of dielectric insulating material separates the first, lower layer of electrodes from the droplet of conducting liquid and the transparent conducting substrate.

A second, upper layer of electrodes is disposed within the dielectric insulating layer between the first, lower layer of electrodes and the droplet. When calibration of the lens is required (e.g., after communications have concluded, or when the system of which the microlens is a part is reset for any reason), a constant and equal voltage is applied to the electrodes in the second, upper layer in such a way that the droplet of conducting liquid is adjusted to its nominal, calibrated position relative to the electrodes in the second, upper layer.

DETAILED DESCRIPTION OF THE INVENTION

Figure 1:
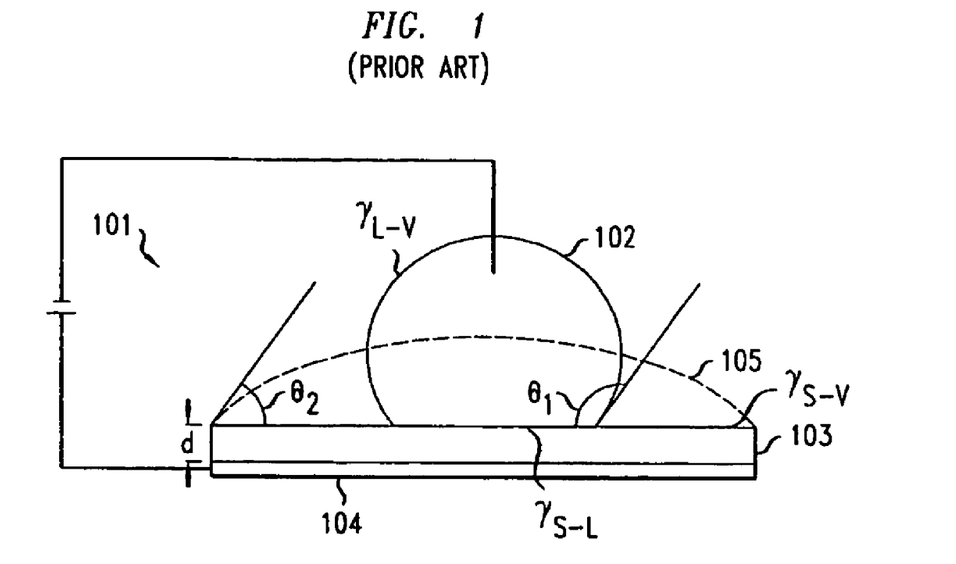
FIG. 1 shows a prior art microlens and its operational effect on a beam of light.

FIG. 1 shows a prior art embodiment of a liquid microlens 101 including a small droplet 102 of a transparent liquid, such as water, typically (but not necessarily) with a diameter from several micrometers to several millimeters. The droplet is disposed on a transparent substrate 103 which is typically hydrophobic or includes a hydrophobic coating. The droplet 102 and substrate 103 need only be transparent to light waves having a wavelength within a selected range. Light waves 104 pass through the liquid microlens focal point/focal spot 105 in a focal plane 106 that is a focal distance "f" from the contact plane 107 between the droplet 102 and the substrate 103.

The contact angle θ between the droplet and the substrate is determined by interfacial surface tensions (also known as interfacial energy) "γ", generally measured in milli-Newtons per meter (mN/m). As used herein, $\gamma_{S-V}$ is the interfacial tenson between the substrate 103 and the air, gas or other liquid that surrounds the substrate, $\gamma_{L-V}$ is the interfacial tension between the droplet 102 and the air, gas or other liquid that surrounds the droplet, and $\gamma_{S-L}$ is the interfacial tension between the substrate 103 and the droplet 102. The contact angle θ may be determined from equation (1):

$$\cos \theta = (\gamma_{S-V} - \gamma_{S-L})/\gamma_{L-V} \quad \text{Equation (1)}$$

The radius "R" in meters of the surface curvature of the droplet is determined by the contact angle θ and the droplet volume in cubic meters (m³) according to equation (2) as follows:

$$R^3 = 3*(\text{Volume})/[\pi*(1-\cos \theta)(2-\cos^2 \theta - \cos \theta)] \quad \text{Equation (2)}$$

The focal length in meters is a function of the radius and the refractive indices "n", where $n_{Liquid}$ is the refractive index of the droplet and $n_{Vapor}$ is the refractive index of the air, gas or other liquid that surrounds the droplet 102. The focal length f may be determined from Equation (3):

$$f = R/(n_{Liquid} - n_{Vapor}) \quad \text{Equation (3)}$$

The refractive index of the substrate 103 is not critical because of the parallel entry and exit planes of the light waves. The focal length of the microlens 101, therefore, is a function of the contact angle θ.

Figure 2:
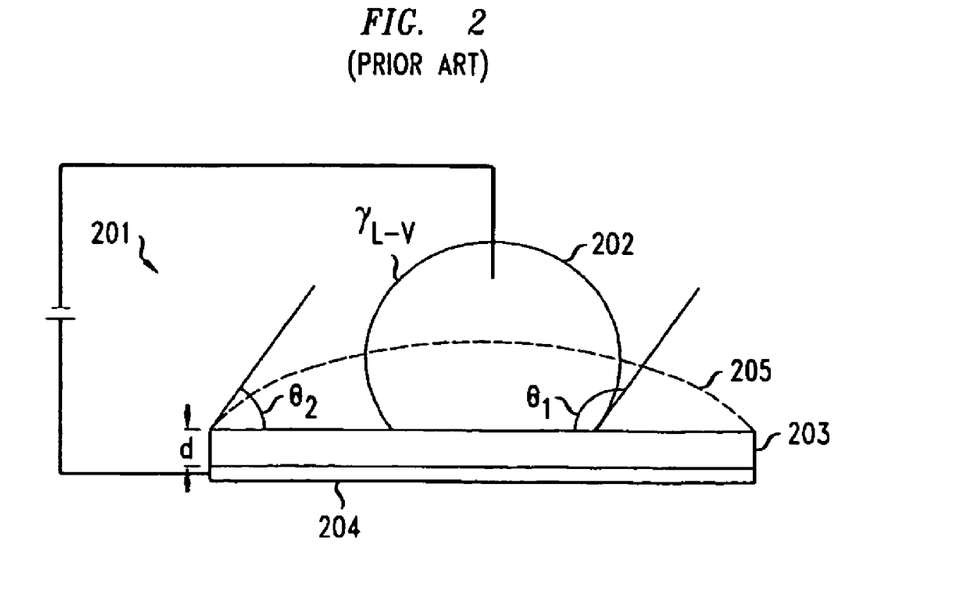
FIG. 2 shows a prior art microlens wherein a voltage differential between an electrode and a droplet of conducting liquid is used to adjust the focal length of the lens.

FIG. 2 shows a prior art microlens 201 whereby the phenomenon of electrowetting may be used to reversibly change the contact angle θ between a droplet 202 of a conducting liquid (which may or may not be transparent) and a dielectric insulating layer 203 having a thickness "d" and a dielectric constant $\in_r$. An electrode 204, such as metal electrode is positioned below the dielectric layer 203 and is insulated from the droplet 202 by that layer. The droplet 202 may be, for example, a water droplet, and the dielectric insulating layer 203 may be, for example, a Teflon/Parylene surface.

When no voltage difference is present between the droplet 202 and the electrode 204, the droplet 202 maintains its shape defined by the volume of the droplet and contact angle $\theta_1$, where $\theta_1$ is determined by the interfacial tensions γ as explained above. When a voltage V is applied to the electrode 204, the voltage difference betweeen the electrode 204 and the droplet 202 causes the droplet to spread. The dashed line 205 illustrates that the droplet 202 spreads equally across the layer 203 from its central position relative to the electrode 204. Specifically, the contact angle θ decreases from $\theta_1$ to $\theta_2$ when the voltage is applied between the electrode 204 and the droplet 202.

The voltage V necessary to achieve this spreading may range from several volts to several hundred volts. The amount of spreading, i.e., as determined by the difference between $\theta_1$ and $\theta_2$, is a function of the applied voltage V. The contact angle $\theta_2$ can be determined from equation (4):

$$\cos \theta(V) = \cos \theta(V=0) + V^2(\in_0 \in_r)/(3d\gamma_{L-V}) \quad \text{Equation (4)}$$

where cos θ (V=0) is the contact angle between the insulating layer 203 and the droplet 202 when no voltage is applied between the droplet 202 and electrode 204; $\gamma_{L-V}$ is the droplet interfacial tension described above; $\in_r$ is the dielectric constant of the insulating layer 203; and $\in_0$ is $8.85 \times 10^{-12}$ F/M—the permittivity of a vacuum.

Figure 3A:
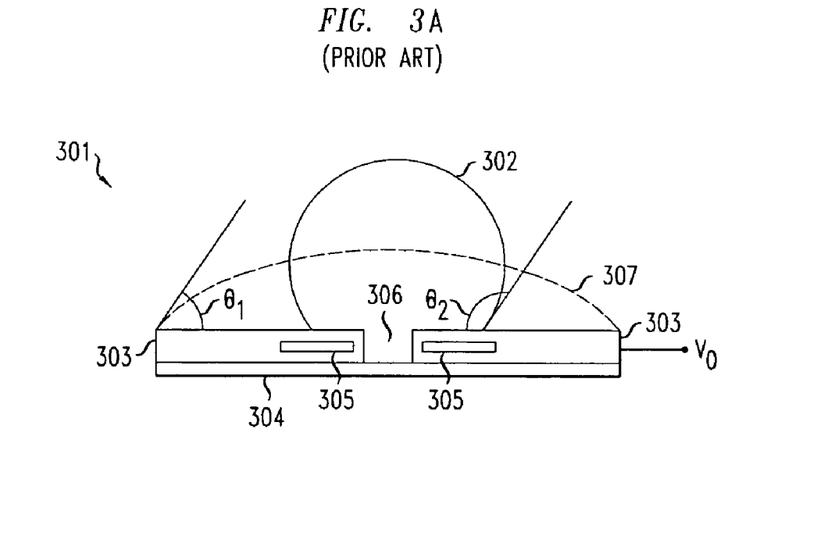
FIGS. 3A and 3B show a prior art microlens wherein the droplet of conducting liquid is electrically coupled to a substrate via a well.

FIGS. 3A and 3B illustrate a prior art tunable liquid microlens 301 that is capable of varying both position and focal length. Referring to FIG. 3A, a tunable liquid microlens 301 includes a droplet 302 of a transparent conductive liquid disposed on a first surface of a transparent, dielectric insulating layer 303. The microlens 301 includes a plurality of electrodes 305 insulated from the droplet 302 by the insulating layer 303. A conducting transparent substrate 304 supports the electrodes 305 and the insulating layer 303 and is connected to the droplet 302 via a well 306 running through the dielectric insulating layer 303. Thus, when voltage $V_O$ is passed over the conducting transparent substrate 304, the droplet 302 also experiences voltage $V_O$.

Figure 3B:
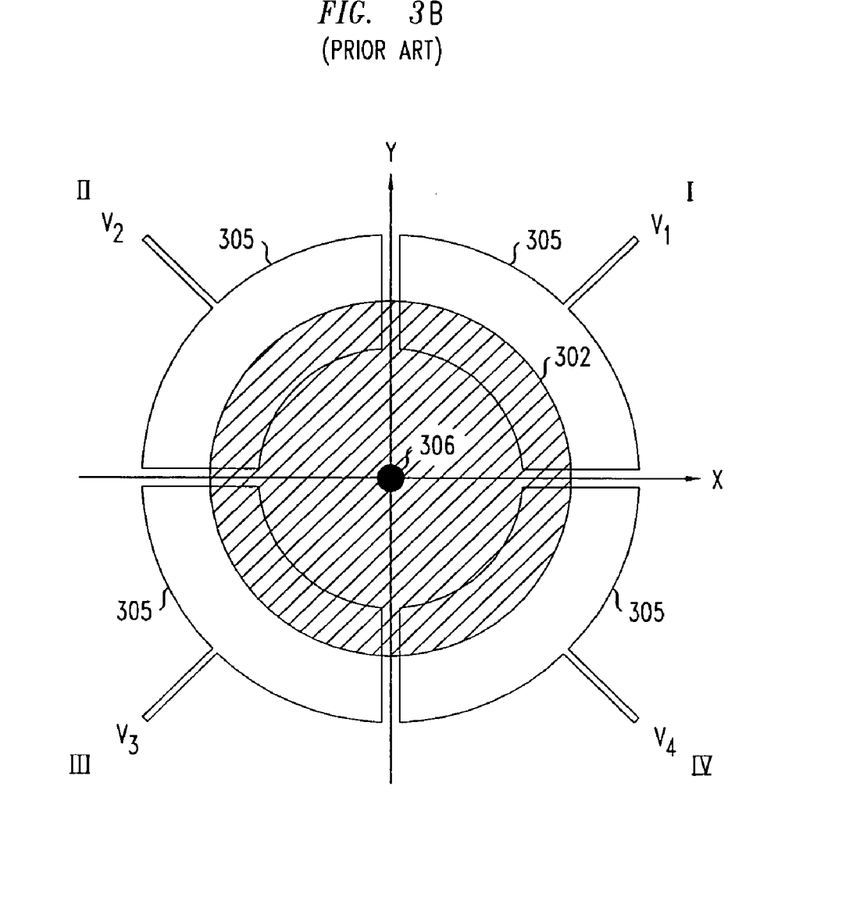

FIG. 3B is a top plan view of an illustrative configuration for the electrodes 305. Each electrode is coupled to a respective voltage $V_1$ through $V_4$ and the droplet 302, which is centered initially relative to the electrodes, is coupled to a voltage $V_O$ via the well 306. When there is no voltage difference between the droplet 302 and any of the electrodes 305 (i.e., $V_1 = V_2 = V_3 = V_4 = V_O$), and the droplet 302 is centered relative to the electrodes and quadrants I thru IV, the droplet 302 assumes a shape as determined by contact angle $\theta_1$ and the volume of droplet 302 in accordance with equations (1)–(3) expained above. The position of the droplet 302 and the focal length of the microlens can be adjusted by selectively applying a voltage potential between the droplet 302 and the electrodes 305. If equal voltages are applied to all four electrodes (i.e., $V_1 = V_2 = V_3 = V_4 \neq V_O$), then the droplet 302 spreads equally within quadrants I, II, III and IV (i.e., equally along lateral axes X and Y). Thus, the contact angle θ between the droplet 302 and insulating layer 303 decreases from $\theta_2$ to $\theta_1$ in FIG. 3A. The resulting shape of the droplet 302 is shown as the dashed line 307 in FIG. 3A. This new shape of the droplet 302 with contact angle $\theta_1$ increases the focal length of the microlens 301 from the focal length of the microlens with the initial contact angle $\theta_2$ (i.e., when $V_1 = V_2 = V_3 = V_4 = V_O$).

Figure 4:
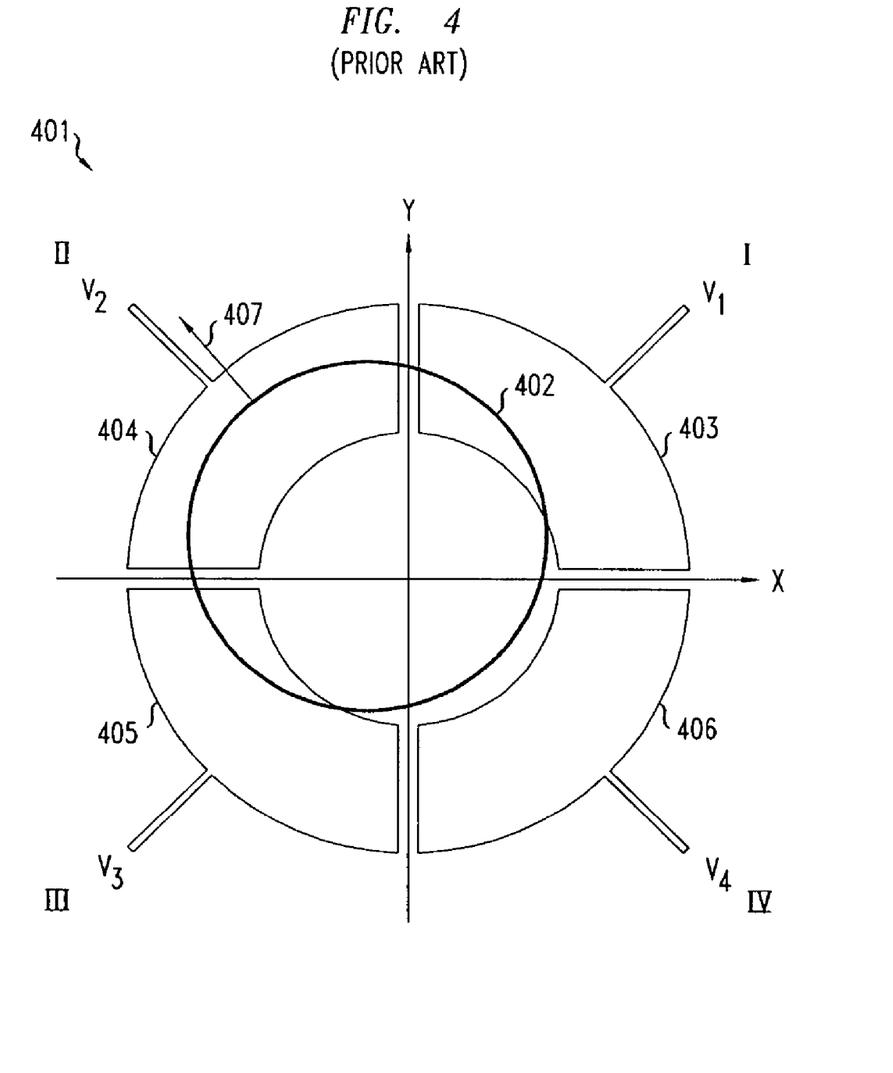
FIG. 4 shows the prior art microlens of FIGS. 3A and 3B wherein a voltage selectively applied to one or more electrodes results in a movement of the droplet away from its centered position relative to the electrodes.

FIG. 4 shows the prior art microlens of FIG. 3A and FIG. 3B wherein the lateral positioning of the droplet, 301 in FIGS. 3A and 3B, along the X and Y axes can also be changed relative to the initial location of the droplet by selectively applying voltages to one or more of the electrodes, 305 in FIGS. 3A and 3B. For example, referring to FIG. 4, by making $V_1 = V_3 = V_O$ and by making $V_2$ greater than $V_4$, the droplet 402 is attracted toward the higher voltage of the electrode 404 and thus moves in direction 407 toward quadrant II. As discussed above, by adjusting the lateral position of the droplet 402, the lateral position of the focal spot of the microlens 401 in that microlens' focal plane is also adjusted. Thus, by selectively adjusting the voltage applied to one or more of the electrodes 403, 404, 405 and 406 relative to the droplet 402 in different combinations, the focal length and the lateral position of the microlens 401 can be selectively adjusted.

While the prior art electrowetting-based microlens embodiments described above are useful in certain applications, they are also limited in certain aspects of their usefulness. In particular, none of the prior art electrowetting microlenses provided a mechanism for achieving automatic microlens calibration, i.e. its automatic return to some nominal, calibrated state with a defined position and focal length. This might be disadvantageous in certain applications. For example, there are many situations where some sort of a search and optimization algorithm needs to be employed in order to achieve optimal tuning/positioning of the droplet. The prior art solutions, not using a calibration mechanism to first calibrate the position of the droplet, require this algorithm to start from a new and unknown microlens position. This could result in a substantial increase in the time necessary to complete the microlens tuning/positioning process. Additionally, an automatic calibration ability would permit the microlens to reset itself to a nominal, well-defined position that is advantageous for initiating operations or for testing purposes. Thus, there remains a need to provide a tunable liquid microlens that is capable of automatic calibration.

Figure 5:
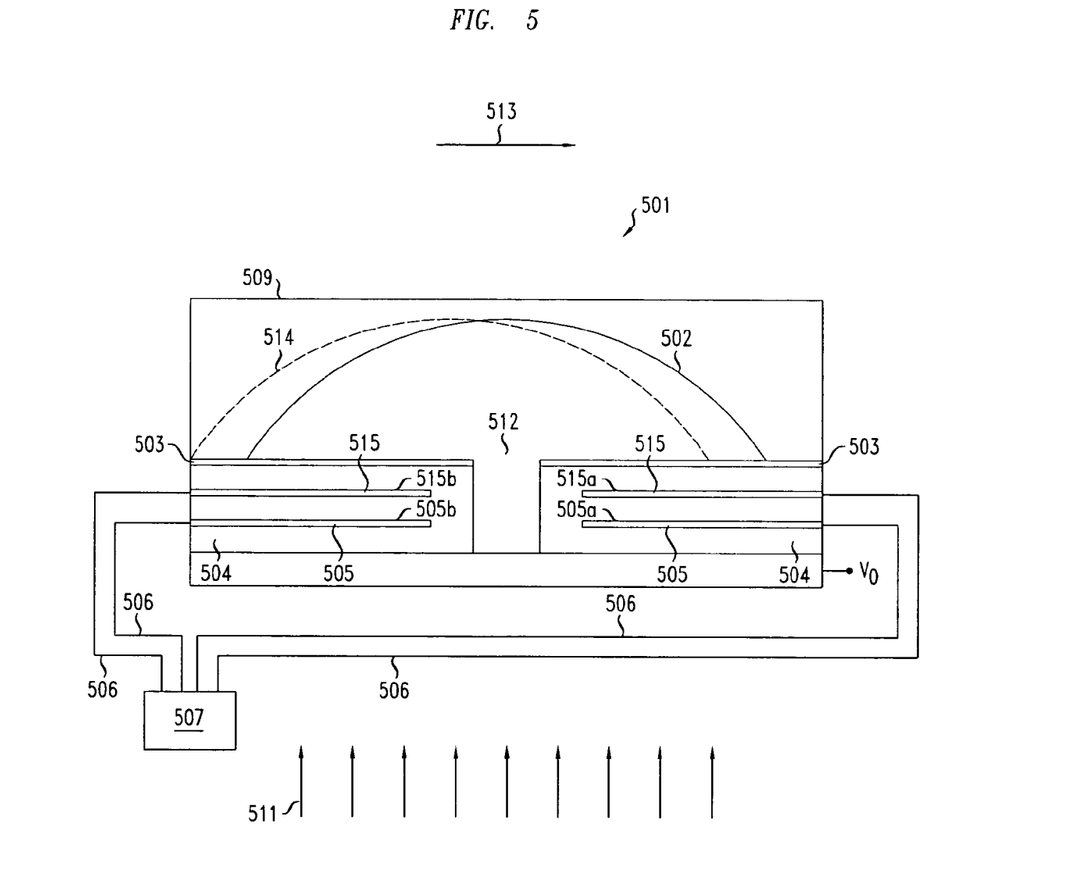
FIG. 5 shows a microlens in accordance with the present invention wherein a second, upper layer of electrodes is used to automatically calibrate the droplet of conducting liquid.

FIG. 5 shows a first embodiment of the present invention wherein a self-calibrating liquid microlens 501 includes a droplet 502 of a transparent conductive liquid disposed on a first surface of a hydrophobic layer 503 which is in turn disposed on a dielectric insulating layer 504. Illustrative dielectric insulating materials include the aforementioned Teflon/Parylene surface. Alternatively, the dielectric insulating layer 504 could be made of a hydrophobic material, thus eliminating the need for a separate hydrophobic layer 503. The microlens 501 includes a first, lower layer of electrodes 505 (shown in cross section in FIG. 5 as electrodes 505a and 505b), and a second, upper layer of electrodes 515 (shown in cross section in FIG. 5 as electrodes 515a and 515b. The electrodes 505 and 515 are insulated from the droplet 502 by the dielectric insulating layer 504. A conducting transparent substrate 506, such as a substrate made from ITO (indium tin oxide) glass, supports the electrodes 505 and the insulating layer 504, and is connected to the droplet 502 via a well 512 running through the hydrophobic layer 503 and the dielectric insulating layer 504. A voltage $V_O$ is applied to the conducting transparent substrate 506 and, hence, the droplet 502. The droplet 502 may advantageously be enclosed in an enclosure liquid or gas 509.

Operations of the microlens are initiated with the droplet in a nominal location, for example centered on the surface 503 relative to the electrodes 505. Voltage $V_c$ over electrodes 515 is, for example, initally set to 0 volts. A constant voltage, not necessarily equal to voltage $V_c$, is also passed initially passed over electrodes 505 such that all electrodes in that layer experience the same voltage (e.g., in FIG. 5, $V_1=V_5$). When a light beam 511 of a selected wavelength, such as that generated by a laser, is aligned with the microlens 501, the electronic circuit 507 maintains the constant voltage $V_1=V_5$ across all electrodes in layer 505 via leads 506.

When the light beam becomes misaligned with the microlens for any reason, the electronic circuit will adjust the voltages across the electrodes in layer 505 such that the droplet 502 will move and become re-aligned with light beam 511. Various methods and apparatus which may be used to detect misalignment and to accomplish this realignment function are described in the copending U.S. patent applications Ser. No. 09/884,605, filed Jun. 19, 2001, entitled "Tunable Liquid Microlens;" Ser. No. 09/951,637, filed Sep. 13, 2001, entitled "Tunable Liquid Microlens With Lubrication Assisted Electrowetting;" and Ser. No. 10/135, 973, filed Apr. 30, 2002, entitled "Method and Apparatus for Aligning a Photo-Tunable Microlens." In all of the techniques described in these applications, the microlens is continuously or periodically adjusted, when necessary, to align itself with the light beam. In addition to moving the droplet 502 to realign the microlens with the light beam 511, the droplet 502 may also be moved when it is desired to steer the focus of the light beam 511 to a different focal point. One skilled in the art will recognize that there are numerous causes for the droplet to move from its initial position to a different position. Whatever the reason for the droplet 502 being moved, the result is that the droplet 502 may be moved during operations such that it is in a different position, such as the position of the droplet represented by dashed line 514, compared to its nominal, calibrated position.

Layer 515 of electrodes is used to calibrate the lens (e.g., either after operations has concluded or periodically during operations). As used herein calibrating the microlens refers to the process of returning the droplet to its nominal, calibrated position relative to the electrodes in layer 515. This calibration is achieved by applying a constant, equal voltage $V_c$ to the electrodes in layer 515 via leads 506, where $V_c > V_O$ volts, while at the same time passing a constant voltage, that is equal to the droplet voltage $V_O$, over the electrodes in layer 505 in a way such that each of the electrodes in layer 505 experience the same voltage as the other electrodes in that layer (e.g., $V_1=V_5$=a constant voltage). As further explained below, the result is that the droplet 514 will move in direction 513 to return to its nominal, calibrated position.

Figure 6:
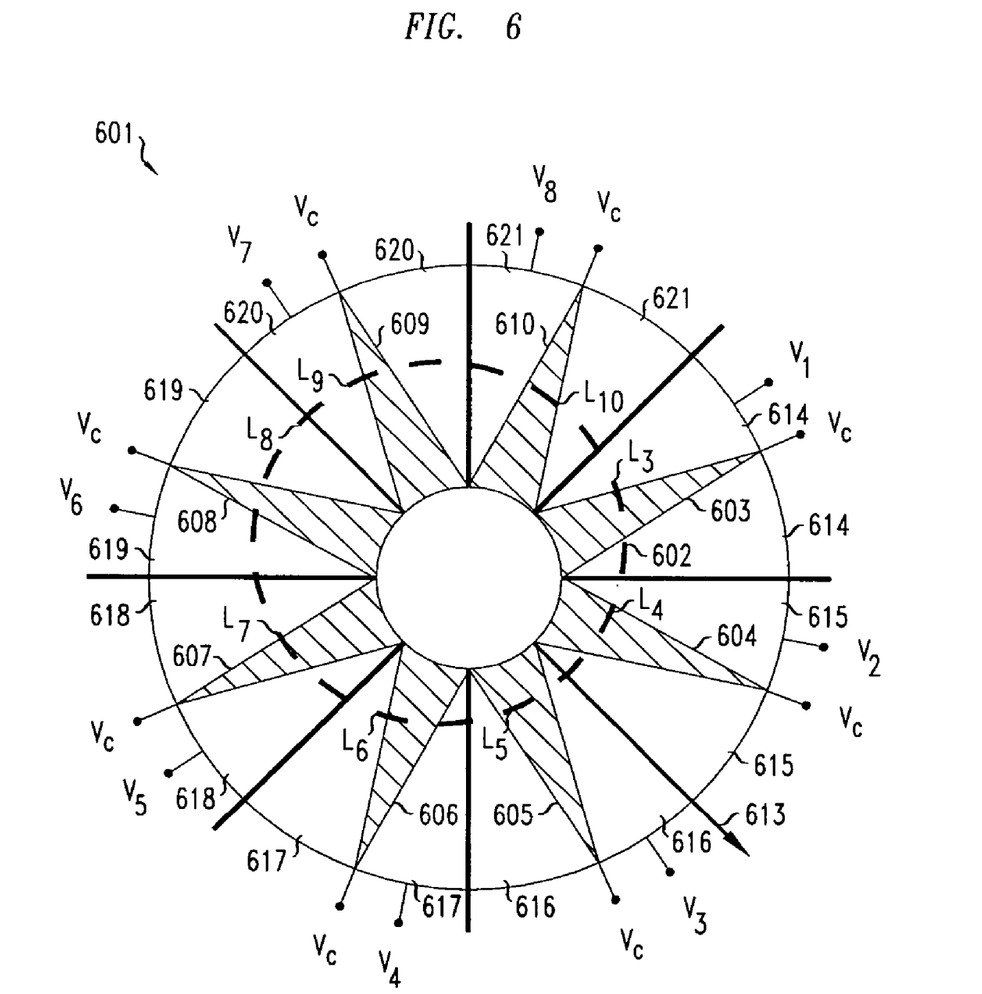
FIG. 6 shows a top plan view of the microlens of FIG. 5 wherein the droplet of conducting liquid is automatically calibrated in response to a voltage differential between the second, upper layer of electrodes and the droplet.

FIG. 6 shows a top plan view of the microlens of FIG. 5 and shows an exemplary configuration of the two layers of electrodes useful in accomplishing the aforementioned calibration function. The electrodes in the lower layer 505 in FIG. 5 are represented in FIG. 6 by electrodes 614 thru 621. The electrodes in the upper layer 515 in FIG. 5 are represented in FIG. 6 as electrodes 603 through 610. These latter electrodes are disposed in a pattern such that the sum of the intersection lengths of the circumference of the microlens droplet of liquid with the second plurality of electrodes 603 thru 610 changes (in this example the sum decreases) as the distance from the center of the pattern of electrodes increases. In other words, when the droplet is centered relative to the second, upper layer of electrodes 603 thru 610, and its diameter is increased (e.g., by applying a constant voltage across the first, lower layer of electrodes), the sum of the length of intersection of the circumference of the droplet, represented by dashed line 602, with the electrodes will decrease. For example, as electrode 603 extends away from the well, its lateral width (as shown in FIG. 6) decreases, i.e., the electrode becomes narrower. As a result, as the diameter of the droplet increases, the circumference of the droplet overlaps with a smaller portion of the electrode. One skilled in the art will recognize that there are other equally advantageous configurations of the first, lower layer of electrodes 614 through 621 and the second, upper layer of electrodes 603 through 610 that are intended to be encompassed by the present invention.

As previously discussed, during operations, the droplet of the microlens 601, which is coupled to voltage $V_O$ via well 612, may be repositioned to, for example, the position represented by dashed line 602 by applying various voltages $V_1$ through $V_8$ to the electrodes 614 through 621 in the lower, first layer of electrodes. To calibrate the microlens such that the droplet is returned to its nominal position, the voltage across electrodes 614 through 621 is made constant such that $V_1=V_2=V_3=V_4=V_5=V_6=V_7=V_8=V_O$. By applying a voltage $V_c$ to each of electrodes 603 through 610, where $V_c > V_O$ volts, a driving force is created which will move the droplet 602 in direction 613 to a nominal, centered position relative to electrodes 603 through 610. The driving force needed to move the droplet in direction 613 is directly proportional to the voltage square $(V_c)^2$ across each electrode multiplied by the intersection $L_n$ between the outer circumference of the droplet and each of the electrodes 603 through 610. The upper electrodes are disposed, for example, in a star-like pattern with wedge-like gaps between the electrodes (or other equally advantageous configuration) in a way such that the length of the intersection of the circumference of the droplet and a particular electrode will decrease as the droplet moves in the direction of that particular electrode. As a result, the driving force will decrease as the droplet 602 moves in direction 613. The droplet 602 will move in direction 613 until $(V_c^*)^2 L_3 = (V_c^*)^2 L_4 = (V_c^*)^2 L_5 = (V_c^*)^2 L_6 = (V_c^*)^2 L_7 = (V_c^*)^2 L_8 = (V_c^*)^2 L_9 = (V_c^*)^2 L_{10}$. For a constant $V_c$ across all electrodes 603 through 610, this relationship can be simplified such that the droplet will move until $L_3=L_4=L_5=L_6=L_7=L_8=L_9=L_{10}$. In other words, the droplet 602 will move until the continuous reduction in the driving force due to the decrease in the length of contact between the circumference of the droplet 602 and the individual electrodes 603 through 610 results in the equilibrium of the forces acting on the droplet. The size and number of the wedge-like gaps between the electrodes 603 through 610 is designed in such a way as to insure that the motion of the droplet 602 halts at the point where it is in its nominal position, in this case centered relative to electrodes 603 through 610. By varying the value of the voltage $V_c$ one can achive a predetermined value of the microlens contact angle and thus a predetermined focal length.

The foregoing merely illustrates the principles of the invention. It will thus be appreciated that those skilled in the art will be able to devise various arrangements which, although not explicitly described or shown herein, embody the principles of the invention and are within its spirit and scope. Furthermore, all examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. A method for use in calibrating a liquid microlens with a droplet of conducting liquid, said method comprising:
    passing a first constant voltage over a first plurality of electrodes; and
    passing at least a second constant voltage over a second plurality of electrodes in order to cause said droplet to move to a calibrated position.

2. The method of claim 1 wherein said second constant voltage is applied to said second plurality of electrodes in such a way that said droplet moves to said calibrated position relative to said second plurality of electrodes.

3. The method of claim 1 wherein said second constant voltage is greater than said first constant voltage.

4. The method of 1 wherein said droplet is disposed on a conducting transparent substrate to which a voltage is applied and said second constant voltage is greater than said applied voltage.

* * * * *